Patented Dec. 14, 1948

2,455,987

UNITED STATES PATENT OFFICE 2,455,987

MANUFACTURE OF HYDROGEN CYANIDE

Leonard Fallows and Eric Vernon Mellers, Spondon, near Derby, England, assignors, by mesne assignments, to Celanese Corporation of America, a corporation of Delaware No Drawing. Application October 3, 1945, Serial No. 620,191. In Great Britain October 25, 1944

8 Claims. (Cl. 23—151)

This invention relates to the manufacture of hydrogen cyanide by reaction between carbon monoxide and ammonia in the presence of a catalyst.

It is known that carbon monoxide and ammonia can be caused to react so as to produce hydrogen cyanide by heating them in the presence of suitable catalysts. Unfortunately, however, the value of this method of making hydrogen cyanide is considerably reduced by the fact that certain undesired side reactions tend to occur simultaneously with the formation of hydrogen cyanide. The most important of these side reactions are the decomposition of the ammonia to nitrogen and hydrogen, the decomposition of the carbon monoxide to carbon and carbon dioxide, and the reaction between carbon monoxide and water vapour (which is formed in the main reaction) to give hydrogen and carbon dioxide. Although it is possible, by carefully selecting the reaction conditions, to reduce the extent to which the first two reactions occur so that they become of secondary importance only, the reaction of the carbon monoxide with water vapour is much more difficult to suppress. This is the more unfortunate in that the presence of carbon dioxide in the reaction zone rapidly reduces the efficiency of many of the most active catalysts for the main reaction.

A considerable number of substances have been proposed as catalysts, but all of them suffer from one or more disadvantages. Most of them are rather expensive, and many act as catalysts for the side reactions mentioned above as well as for the main reaction, thus reducing the proportion of the ammonia which is converted into hydrogen cyanide. Moreover, those of the known catalysts which give the highest conversions of ammonia to hydrogen cyanide are, generally speaking, those which most rapidly decrease in activity. It is an object of the present invention to provide a catalyst for the production of hydrogen cyanide from ammonia and carbon monoxide which is easily and cheaply obtained, is robust, gives rise to little or no carbon dioxide, maintains its activity for considerable periods under the reaction conditions, and is capable of converting a satisfactorily high proportion of the ammonia into hydrogen cyanide.

According to the present invention hydrogen cyanide is made by bringing a gas mixture comprising carbon monoxide and ammonia into contact with manganese dioxide as catalyst at a temperature above 450° C.

The manganese dioxide may be in powder form or deposited on a carrier, but it is preferably used in the form of a composition made by setting a mixture of manganese dioxide and cement with water. A very useful catalyst composition may be made by mixing manganese dioxide with 1 to 6 times its weight of Portland cement, forming the mixture into a slurry with water, and allowing the slurry to set in the form of thin slabs. The composition is preferably allowed to age for about 3 to 6 months, after which it is ready for use.

Manganese dioxide catalysts, and especially manganese dioxide-cement compositions, have a number of advantages over other substances which have been proposed as catalysts for the production of hydrogen cyanide from carbon monoxide and ammonia. Not only are they active in causing the formation of hydrogen cyanide with little or no carbon dioxide, but they maintain their activity for long periods under the reaction conditions. Furthermore, manganese dioxide-cement compositions are cheap, robust, and easily made and handled.

The reaction between the carbon monoxide and ammonia may for example be carried out by passing the gases through an iron or other suitable tube containing the catalyst. The tube may be heated to any temperature between about 450° and 700° C., but we prefer to employ temperatures between about 500° and 650° C., especially between about 550° and 650° C. Generally speaking the higher the temperature within the range 450°–700° C. the higher is the proportion of ammonia which is converted into hydrogen cyanide, but at the same time the proportion lost by side reactions is also higher. Moreover while at temperatures of about 500°–550° C. the amount of carbon dioxide formed is often so small that it cannot be determined by the ordinary methods of gas analysis, at higher temperatures the amount formed increases, although within the temperature range specified it never becomes serious.

The pressure of the gases in the reaction zone may be atmospheric, although if desired higher pressures may be used. The carbon monoxide and ammonia may if desired be used in admixture with certain other gases, for example nitrogen or hydrogen, but the reaction may then be somewhat slower and the proportion of ammonia converted into hydrogen cyanide lower than when the carbon monoxide and ammonia are used in the absence of substantial amounts of other gases.

Although equal molecular proportions of carbon monoxide and ammonia take part in the reaction, the proportion of the ammonia converted into hydrogen cyanide is, if the other conditions are kept constant, higher if the ammonia is mixed with a considerable excess of carbon monoxide. For example, for every molecular proportion of ammonia in the initial gas mixture, there may with advantage be more than 3, for example from 6 to 40, molecular proportions of carbon monoxide. Unreacted carbon monoxide can be recycled. The space velocity of the gas mixture through the reaction zone may vary over a wide range, for example between about 10 and 100 litres of ammonia (at normal temperature and pressure, i. e., at 0° C. and 760 mm. of mercury) per hour per litre of catalyst.

The gases leaving the reaction zone contain, besides hydrogen cyanide, unchanged carbon monoxide and also as a rule some unchanged ammonia, together with water vapour, some hydrogen and nitrogen, and sometimes a very small amount of carbon dioxide. In order to isolate the hydrogen cyanide from this mixture, it is preferable first to wash the gases with an anhydrous relatively weak acid, for example glacial acetic acid, so as to remove ammonia, and then to condense the hydrogen cyanide and water vapour by intensive cooling. The condensate may contain, beside aqueous hydrogen cyanide, a certain amount of the washing acid and its ammonium salt, but the hydrogen cyanide is easily isolated by fractional distillation.

The invention is illustrated by the following examples.

Example I

Manganese dioxide was intimately mixed with three times its weight of cement, and sufficient water was then added to form a slurry. The slurry was spread into thin sheets and allowed to set, after which the sheets were kept for six months and then broken up and screened.

A gas mixture consisting of 20 volumes of carbon monoxide and 1 volume of ammonia was passed through an iron tube containing a manganese dioxide catalyst prepared as above described; the tube was heated to 610° C., and the space velocity of the gas was 11 litres of ammonia per hour per litre of catalyst, i. e. about 230 litres of the gas mixture per hour per litre of catalyst. On leaving the tube the gaseous products were met by a stream of glacial acetic acid in amount at least sufficient to combine with all the unchanged ammonia, and were then cooled sufficiently to condense the hydrogen cyanide formed in the reaction. The condensate was subjected to fractional distillation whereby the hydrogen cyanide was isolated in a substantially pure state. The amount of hydrogen cyanide obtained corresponded to about 43% of the ammonia used, and a further 18% of the ammonia was recovered as ammonium acetate.

Example II

A gas mixture consisting of 40 volumes of carbon monoxide and 1 volume of ammonia was passed through an iron tube containing the same catalyst as was used in Example I. The tube was heated to 620° C., and the space velocity of the gas was 11 litres of ammonia (about 450 litres of the mixture) per hour per litre of catalyst. The gaseous products on leaving the tube were treated as described in Example I. The proportion of the ammonia converted into hydrogen cyanide was slightly higher than in Example I.

Example III

The procedure described in Example I was used with a gas mixture consisting of about 8 volumes of carbon monoxide and 1 volume of ammonia. The tube was heated to 630° C. and the space velocity was about 70 litres of ammonia (630 litres of the gas mixture) per hour per litre of catalyst. About 40% of the ammonia was converted into hydrogen cyanide.

Example IV

The procedure of Example I was used with a gas mixture consisting of 6 volumes of carbon monoxide to 1 volume of ammonia. The tube was heated to 550° C., and the space velocity was about 45 litres of ammonia (315 litres of the gas mixture) per hour per litre of catalyst. The proportion of the ammonia converted to hydrogen cyanide was about 36%, and over 50% of the ammonia was recovered as ammonium acetate.

Having described our invention, what we desire to secure by Letters Patent is:

1. Process for the manufacture of hydrogen cyanide, which comprises passing ammonia mixed with at least an equal volume of carbon monoxide and substantially free from oxidizing gases in contact with a catalyst which, at the beginning of the reaction, comprises manganese dioxide at a space velocity of at least 10 litres of ammonia, measured at 0° C. and 760 millimeters of pressure, per hour per litre of catalyst and at a temperature above 450° C.

2. Process for the manufacture of hydrogen cyanide, which comprises passing ammonia mixed with at least 3 times its volume of carbon monoxide and substantially free from oxidizing gases in contact with a catalyst which, at the beginning of the reaction, consists of manganese dioxide set in cement at a space velocity of at least 10 litres of ammonia, measured at 0° C. and 760 millimeters of pressure, per hour per litre of catalyst and at a temperature above 450° C.

3. Process for the manufacture of hydrogen cyanide, which comprises passing ammonia mixed with 6 to 40 times its volume of carbon monoxide and substantially free from oxidizing gases in contact with a catalyst which, at the beginning of the reaction, comprises manganese dioxide at a space velocity of 10 to 100 litres of ammonia, measured at 0° C. and 760 millimeters of pressure, per hour per litre of catalyst and at a temperature of 500° to 650° C.

4. Process for the manufacture of hydrogen cyanide, which comprises passing ammonia mixed with at least 3 times its volume of carbon monoxide and substantially free from oxidizing gases through a tube containing a catalyst which, at the beginning of the reaction, consists of manganese dioxide set in 1 to 6 times its weight of cement at a space velocity of 10 to 100 litres of ammonia, measured at 0° C. and 760 millimeters of pressure, per hour per litre of catalyst and at a temperature of 450° to 700° C.

5. Process according to claim 4, wherein the catalyst is made by setting a mixture of manganese dioxide with 1 to 6 times its weight of cement by means of water and allowing the composition so obtained to age for 3 to 6 months before use.

6. Process for the manufacture of hydrogen cyanide, which comprises passing ammonia mixed with 6 to 40 times its volume of carbon monoxide and substantially free from oxidizing gases through a tube containing a catalyst which, at the beginning of the reaction, consists of manganese dioxide set in 1 to 6 times its weight of cement at a space velocity of 10 to 100 litres of ammonia, measured at 0° C. and 760 millimeters of pressure, per hour per litre of catalyst and at a temperature of 500° to 650° C.

7. Process for the manufacture of hydrogen cyanide, which comprises passing ammonia mixed with 6 to 40 times its volume of carbon monoxide and substantially free from oxidizing gases through a tube containing a catalyst which, at the beginning of the reaction, consists of manganese dioxide set in 1 to 6 times its weight of cement at a space velocity of 10 to 100 litres of ammonia, measured at 0° C. and 760 millimeters of pressure, per hour per litre of catalyst and at a temperature of 500° to 650° C. and substantially immediately afterwards freeing the resulting gas mixture from unreacted ammonia by treatment with acid and then cooling it sufficiently to condense substantially all the hydrogen cyanide formed.

8. Process according to claim 7, wherein the catalyst is made by setting a mixture of manganese dioxide with 1 to 6 times its weight of cement by means of water and allowing the composition so obtained to age for 3 to 6 months before use.

LEONARD FALLOWS.
ERIC VERNON MELLERS.

REFERENCES CITED

The following references are of record in the file of this patent:

UNITED STATES PATENTS

| Number | Name | Date |
|---|---|---|
| 1,602,404 | Frazer | Oct. 12, 1926 |

OTHER REFERENCES

Sinozaki et al.: Chemical Abstracts, vol. 20, page 3625 (1926).

Mellor: Inorganic and Theoretical Chemistry, vol. 12, pp. 255 and 256. Longmans, Green and Co., London (1932).

Berkman et al.: Catalysis, p. 507. Reinhold Pub. Co., New York (1940).